Channel Address Modification Structure

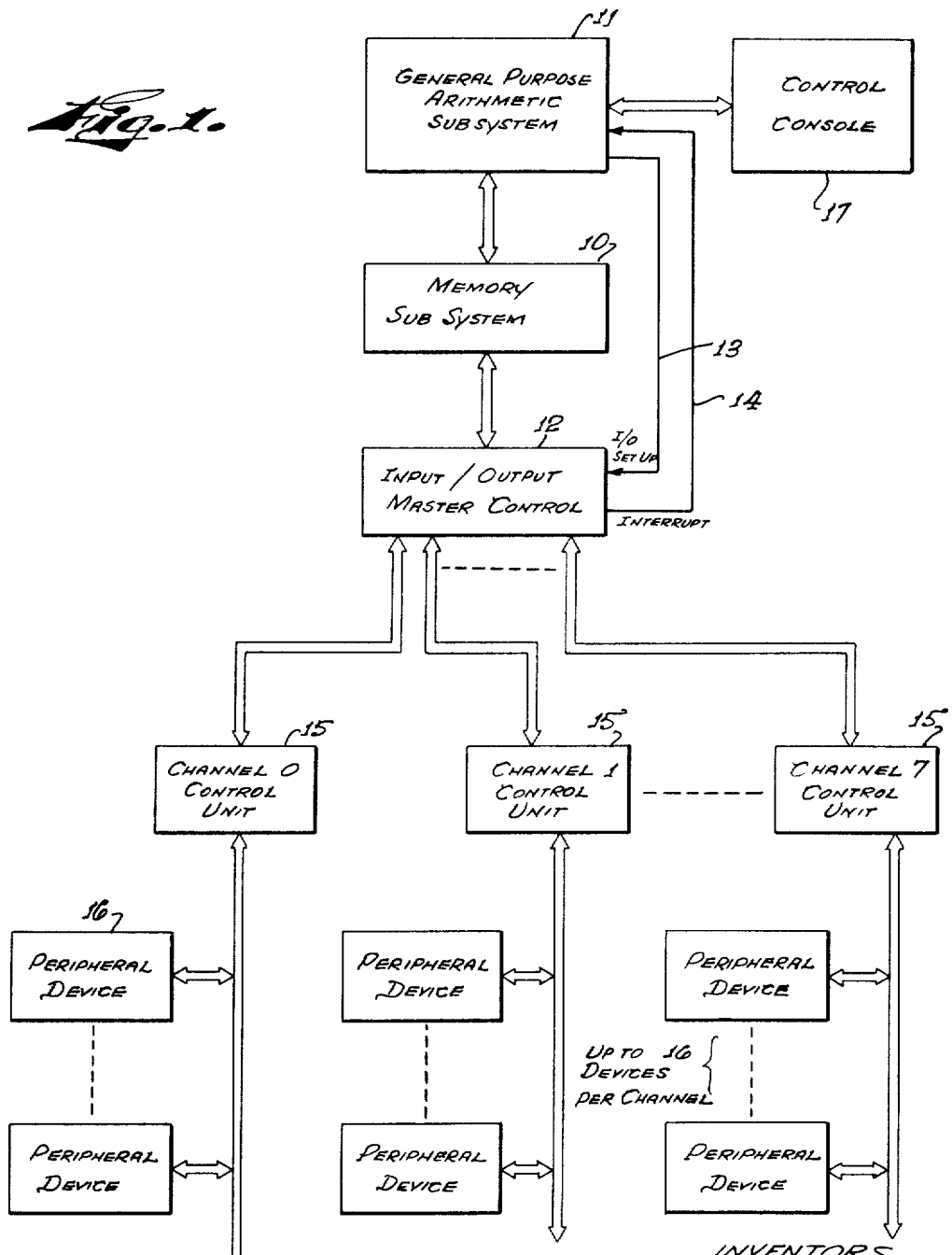

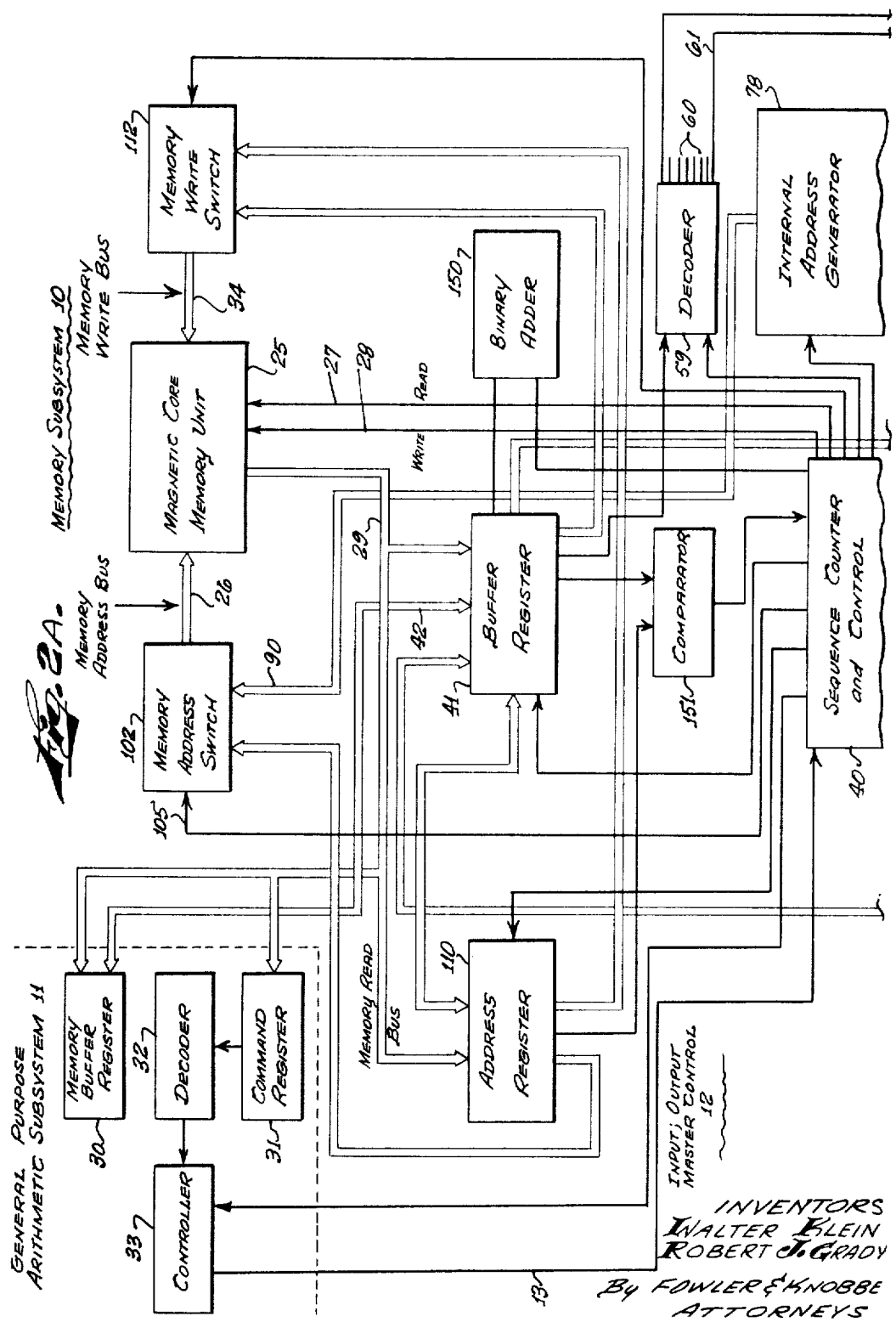

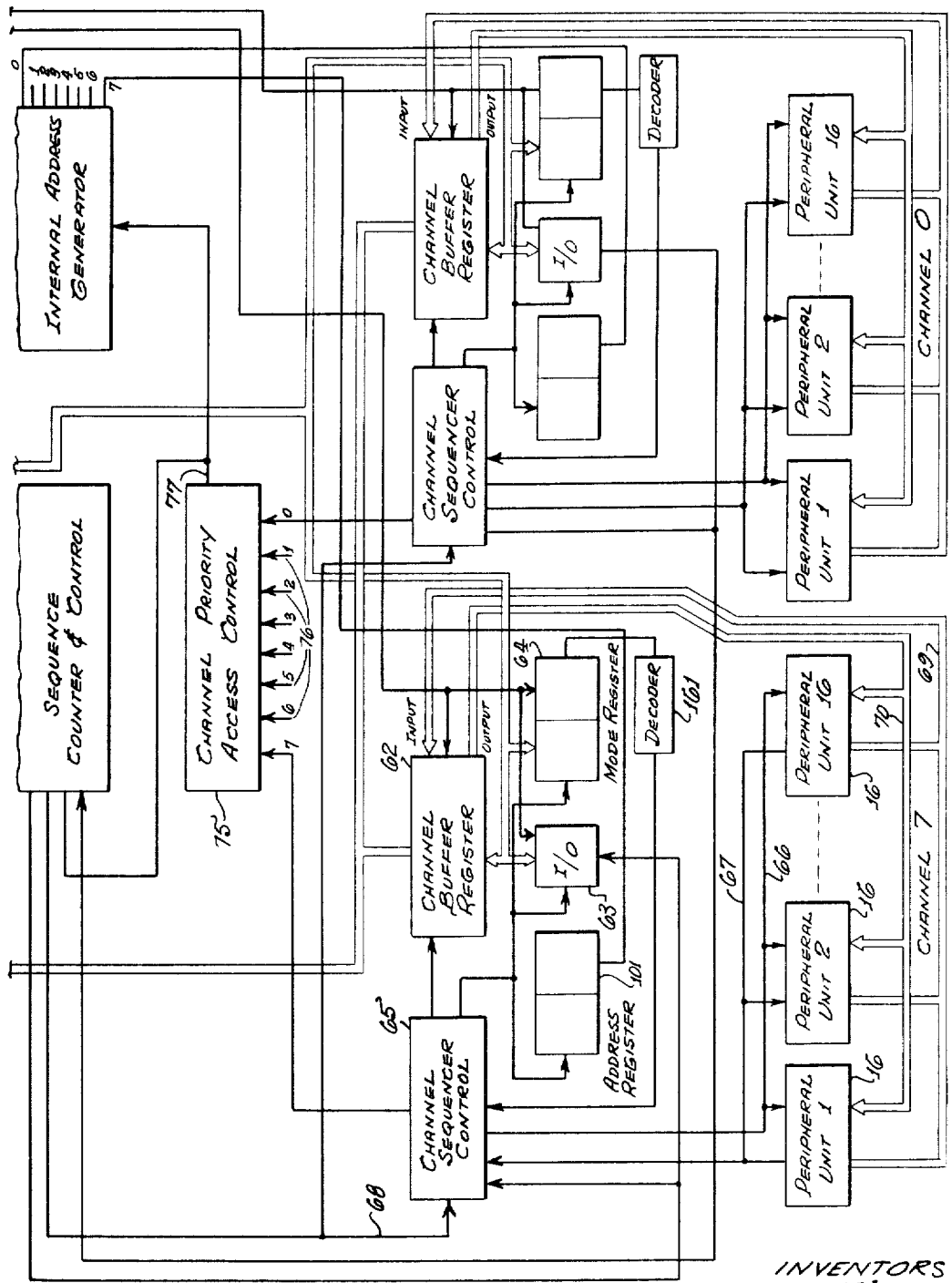

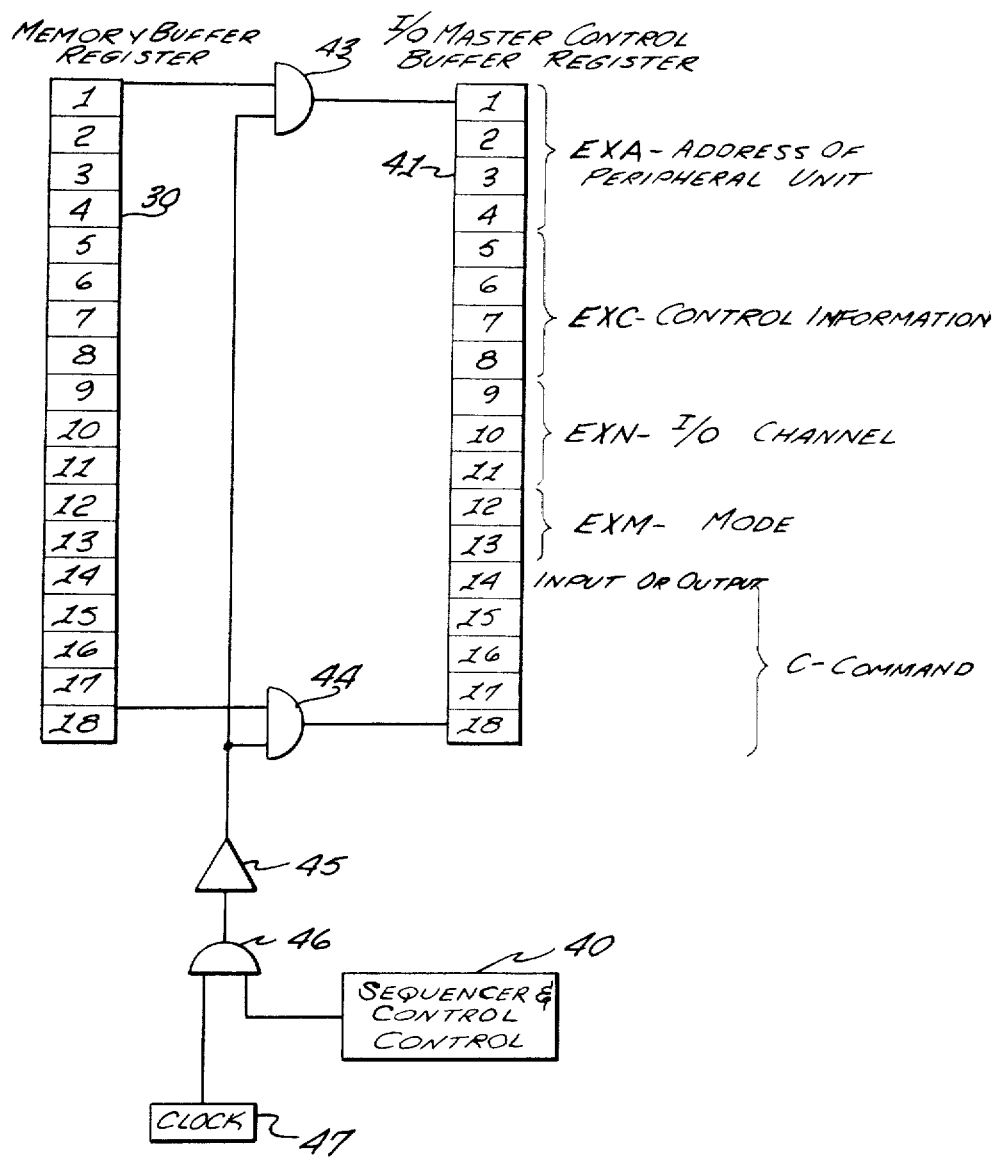

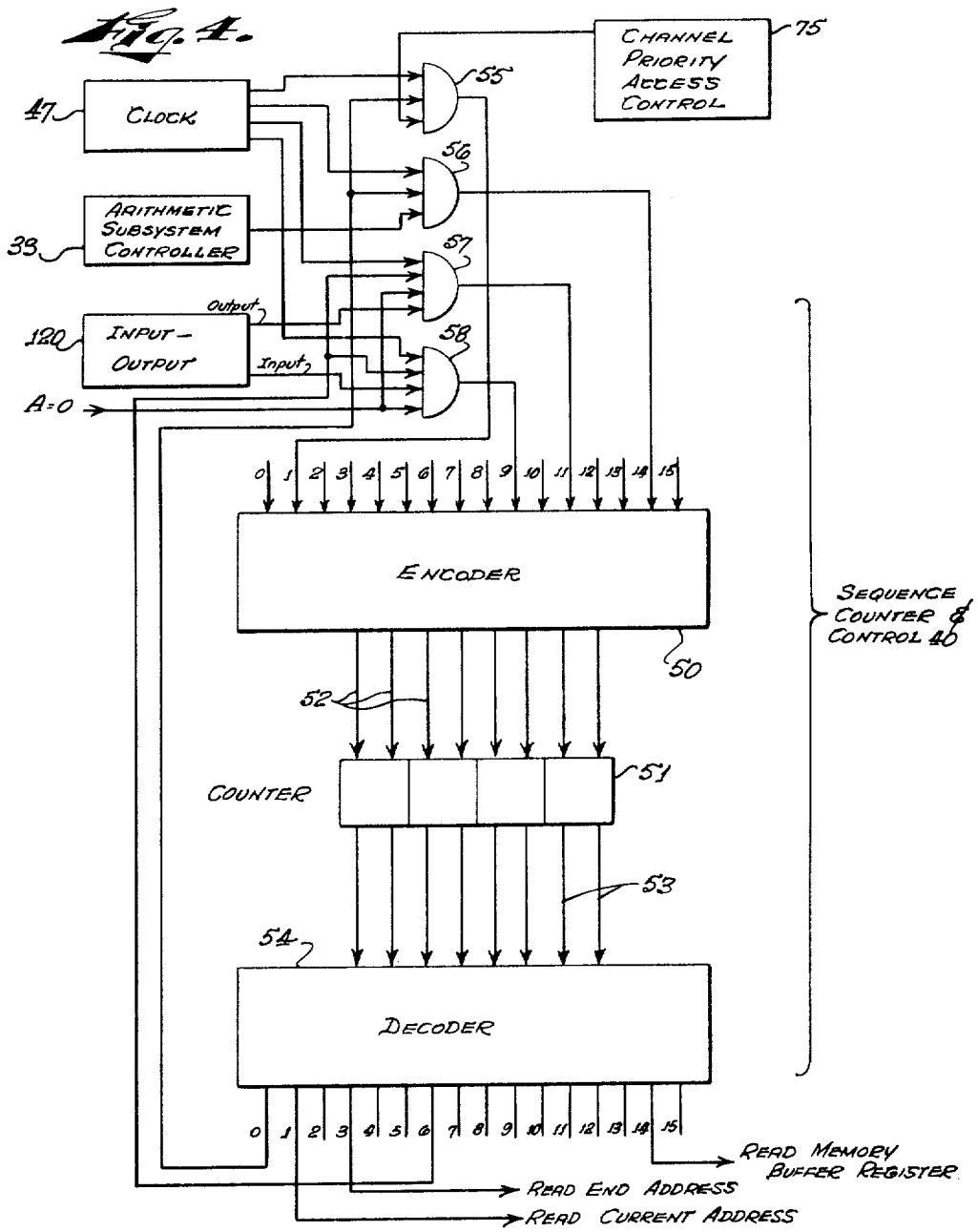

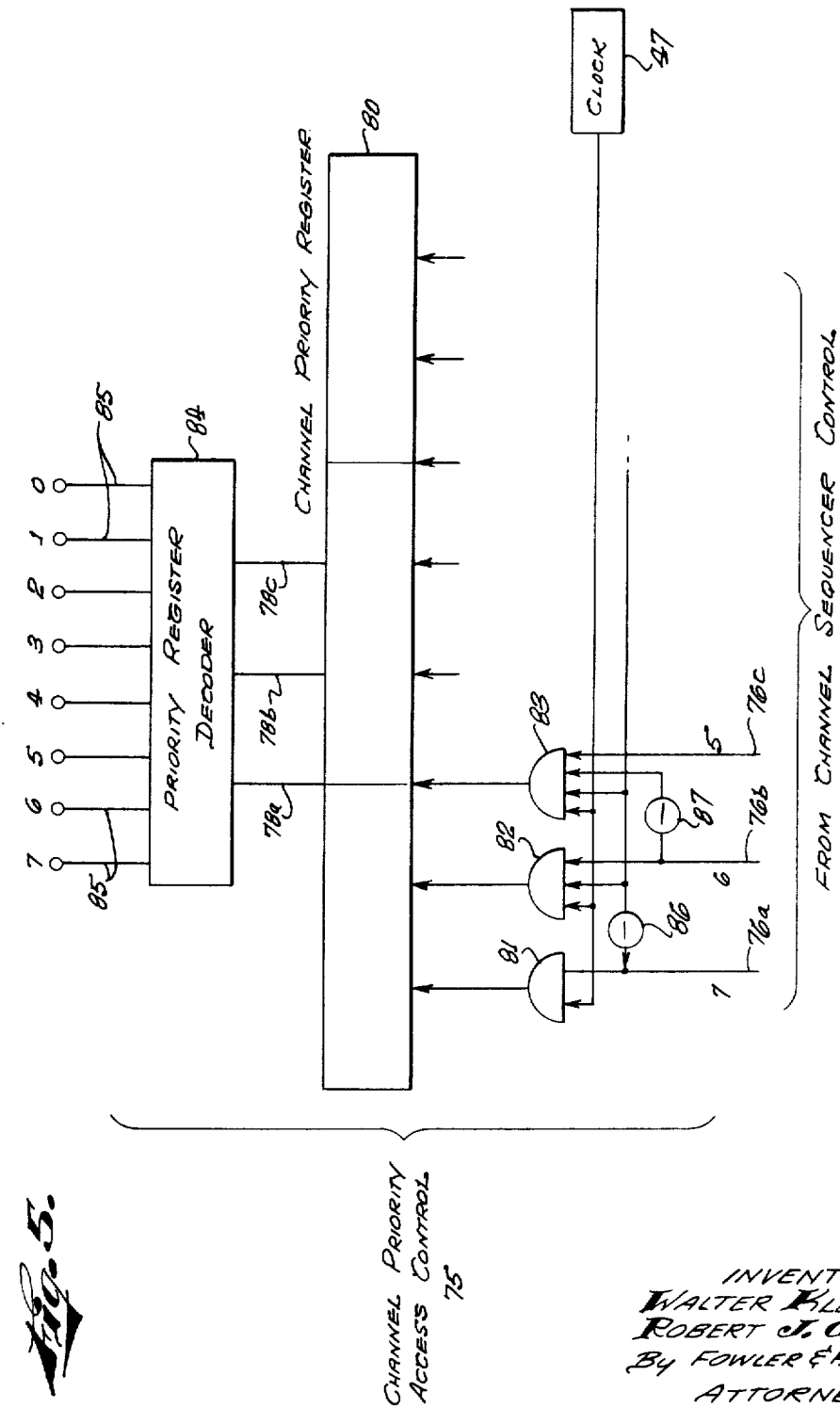

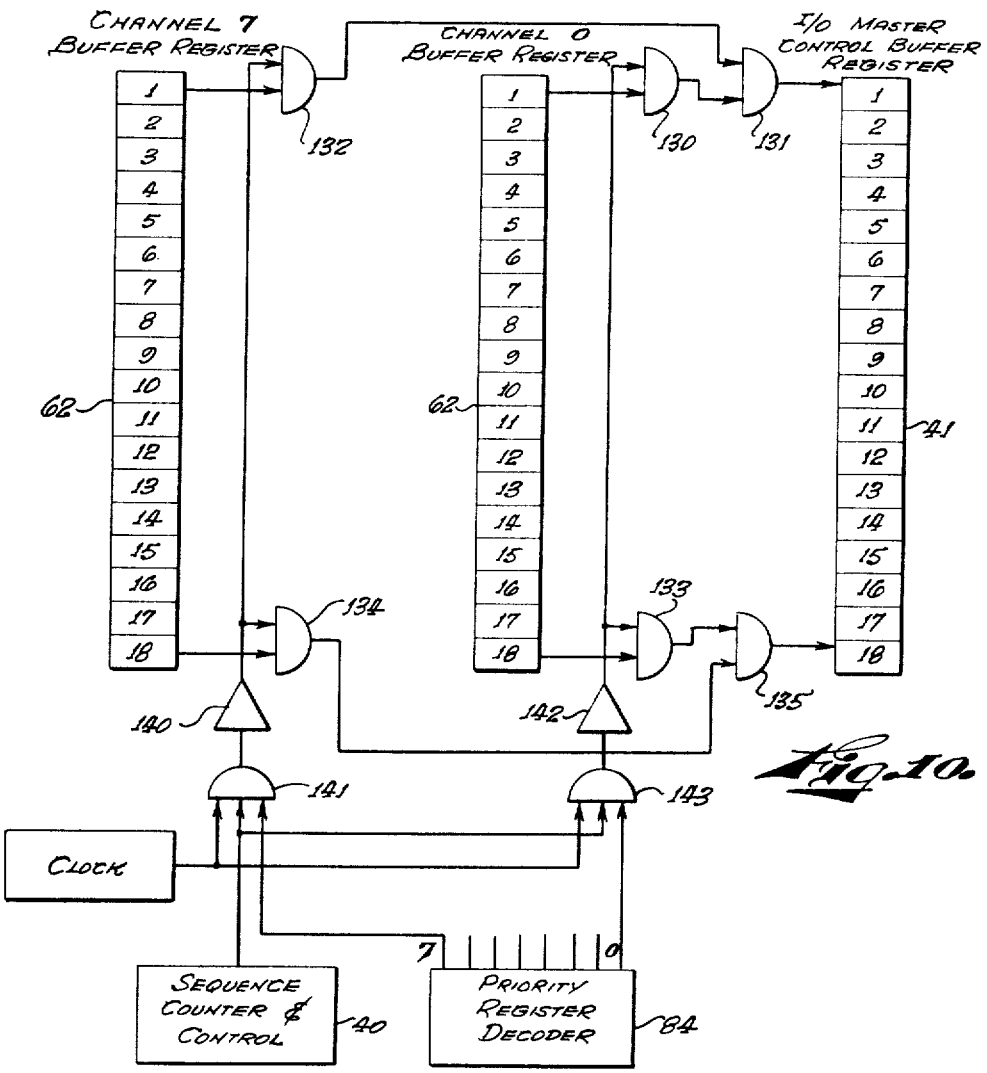

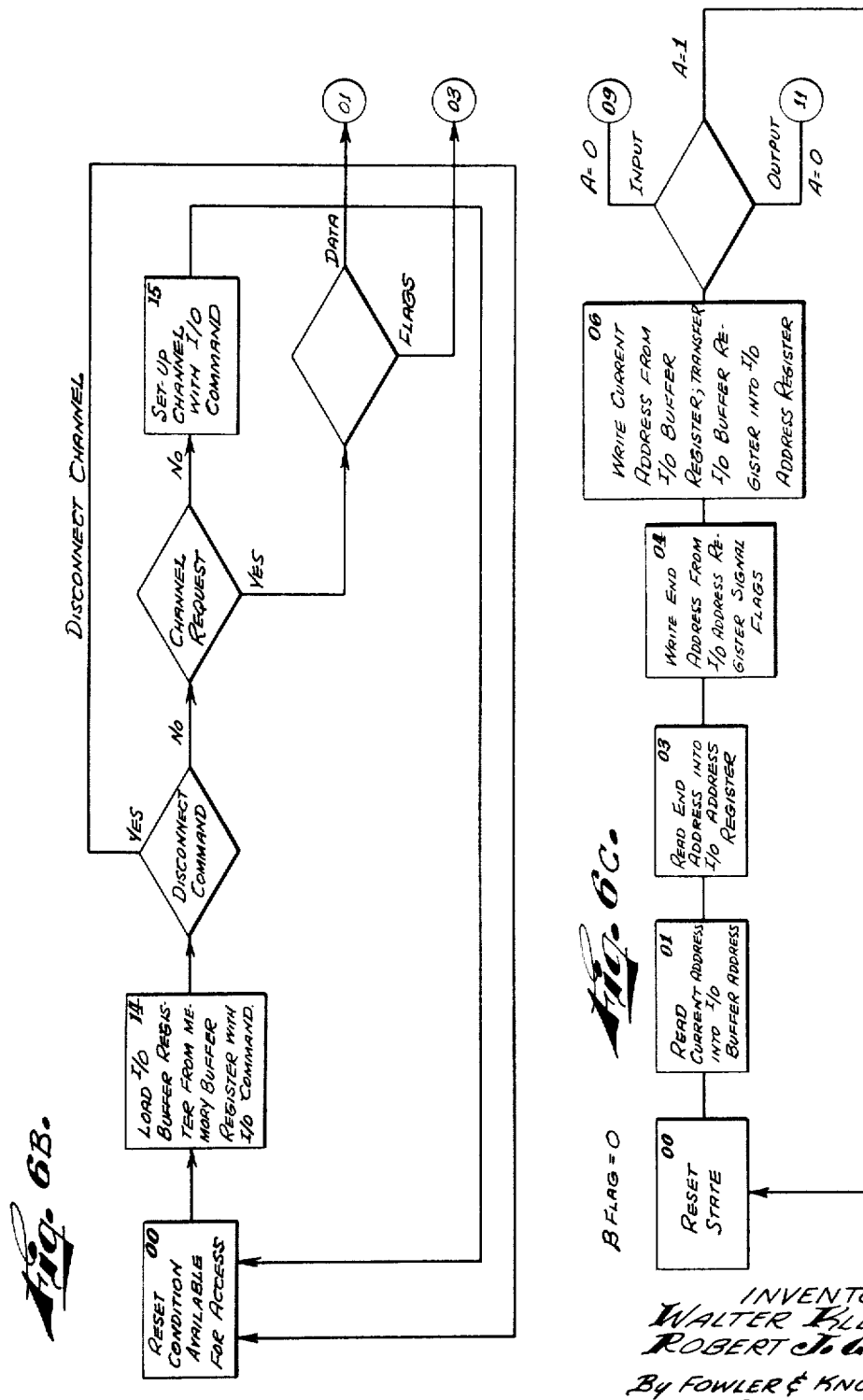

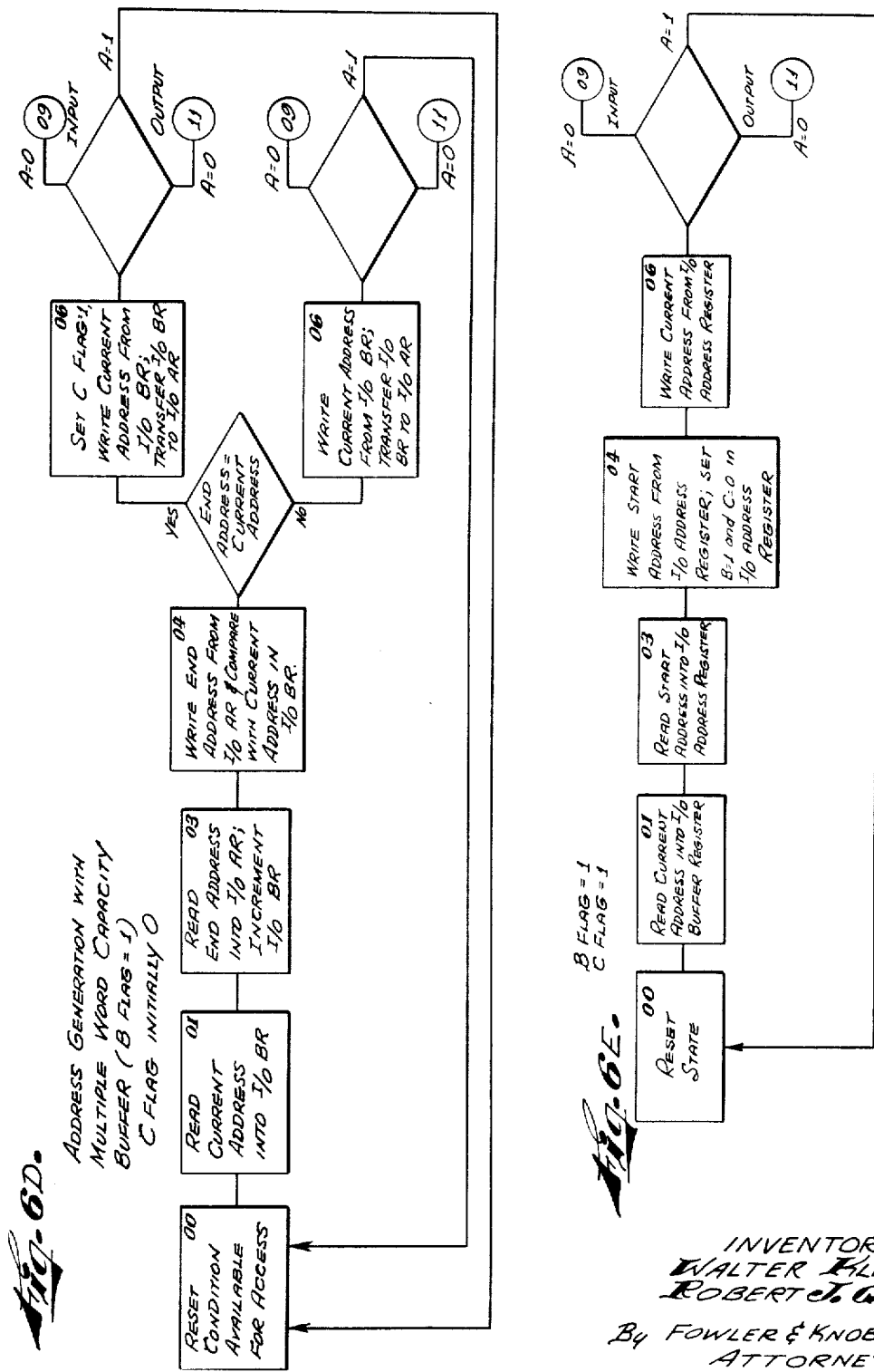

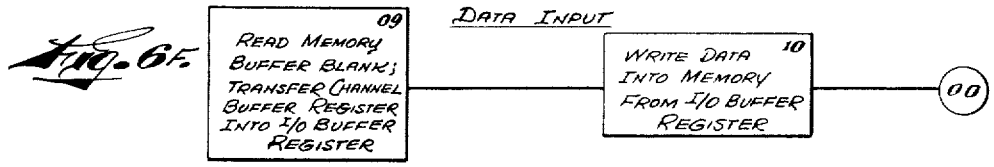
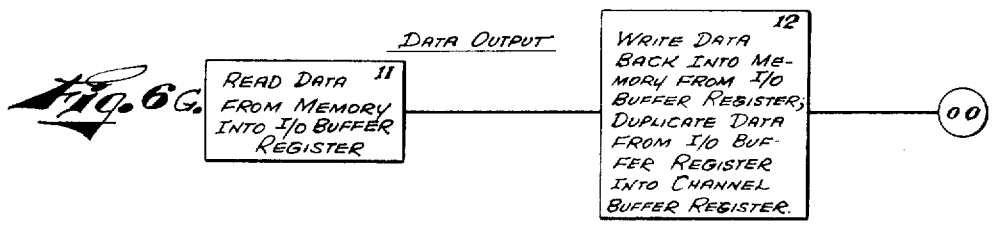
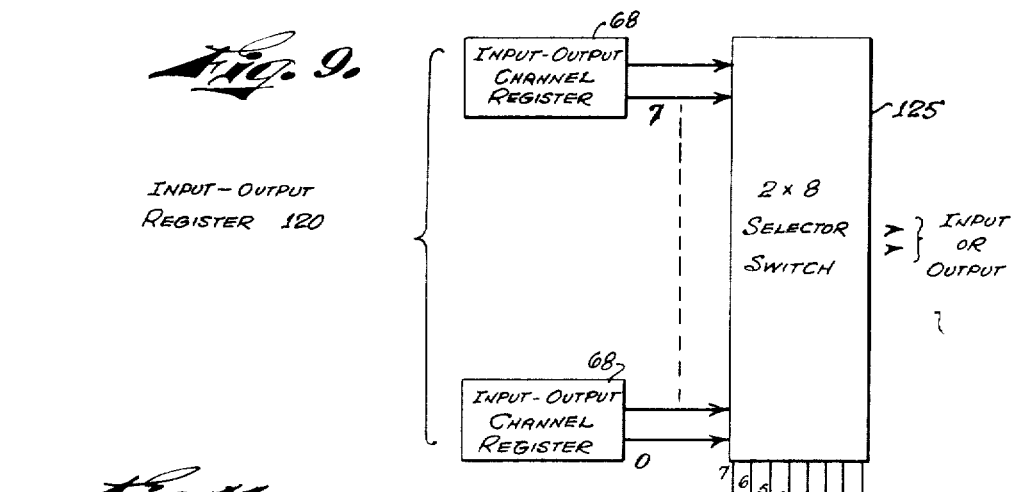
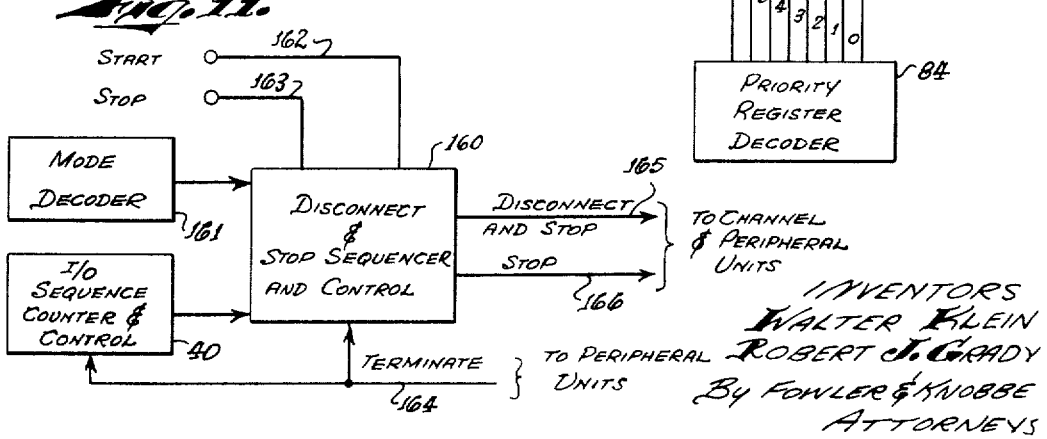

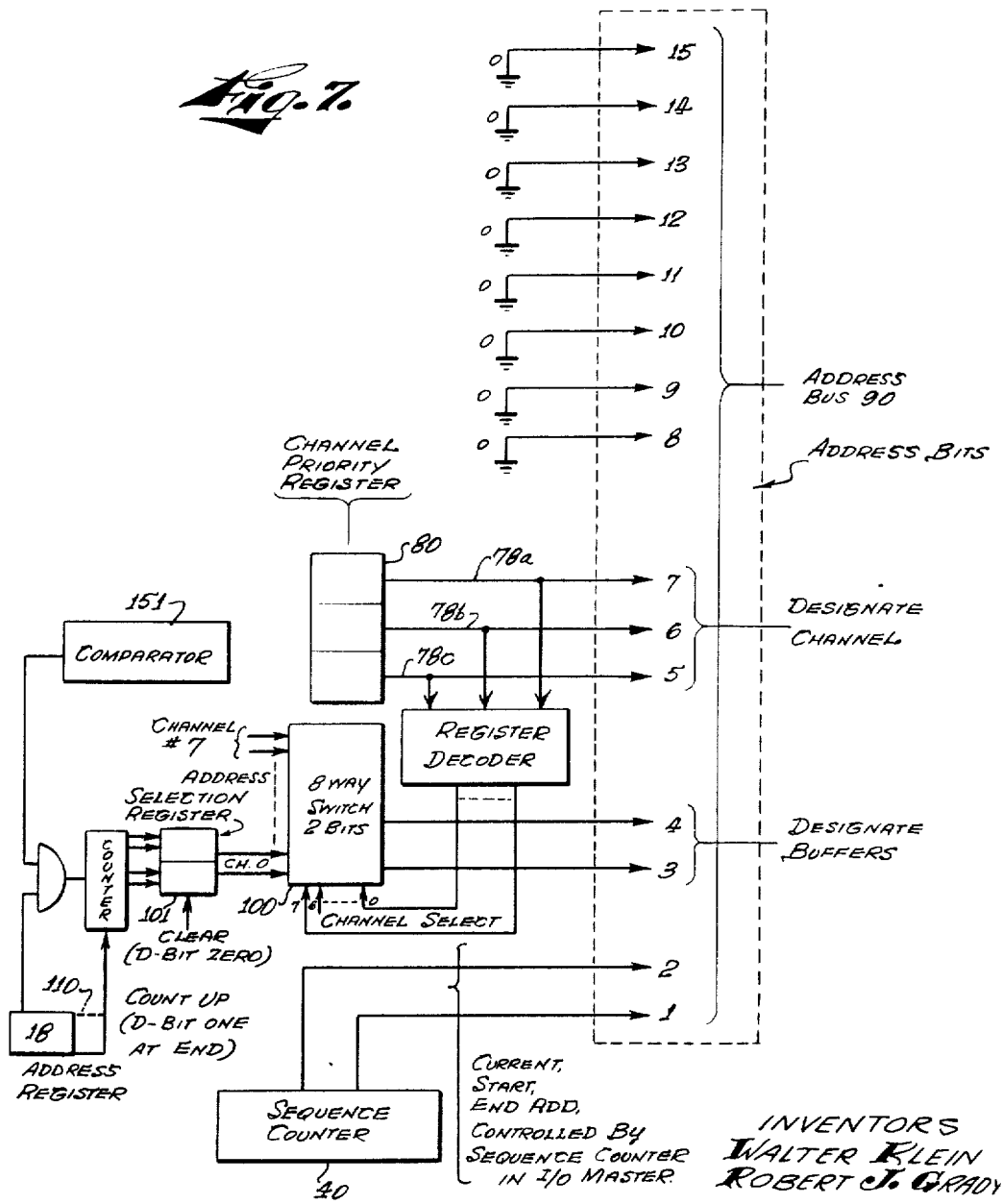

INVENTORS
WALTER KLEIN
ROBERT J. GRADY
By FOWLER & KNOBBE
ATTORNEYS

United States Patent Office 3,283,308
Patented Nov. 1, 1966

3,283,308
DATA PROCESSING SYSTEM WITH AUTONOMOUS INPUT-OUTPUT CONTROL
Walter Klein, Santa Ana, and Robert J. Grady, Garden Grove, Calif., assignors to Beckman Instruments, Inc., a corporation of California
Filed June 10, 1963, Ser. No. 286,677
16 Claims. (Cl. 340—172.5)

The present invention relates to an improved digital data processing system having an autonomous input-output control.

Digital data processors such as digital computers, controllers, etc. include an arithmetic subsystem for performing computation upon binary coded data, a memory subsystem for storing commands and data of an operational program, peripheral means for receiving data in various forms from a variety of data source devices and peripheral means for transferring data in various forms to a variety of data receiving devices. Reference is made to the "Computer Handbook" edited by H. D. Huskey and G. A. Korn, published by the McGraw-Hill Company in 1962 for a detailed description of the present state of the art for each of these subsystems. As is well known, contemporary digital computer designs provide very fast performance within the arithmetic and memory subsystems. Accordingly, the efficiency of modern data processing systems depends primarily upon the means by which data between the processor and the peripheral devices can be exchanged.

One problem in exchanging data between the various peripheral devices and the processor is that a plurality of data receiving and data transmitting devices are used in conjunction therewith. Examples of data receiving devices are electric typewriters, high speed printers, alpha numerical displays, paper tape or card punches, and magnetic tape units. Examples of data transmitting devices are analog to digital converters, electric typewriters, punched paper tape readers, punched card readers, and magnetic tape units. These devices operate at varying rates, the magnetic tape units and electronic analog to digital converter operating much faster, for example than punched paper tape readers.

Another problem allied with that of the several data receivers and transmitters is that of reducing to an absolute minimum the use of the arithmetic processor for extraneous duties, e.g. controlling the input and output of data exchanges. Otherwise, valuable computer operating time is spent in operations other than arithmetic. Additionally, the introduction of the input data into the data processor may be delayed if dependent upon preprogrammed input-output commands.

Accordingly, an object of the present invention is to provide a data processing system wherein the exchange of data between the peripheral devices and the computer memory is substantially autonomous and independent of the arithmetic processor.

Another object of this invention is to provide a time sharing of the memory whereby independent flow paths are maintained simultaneously between a number of memory storage areas and a plurality of peripheral data transmitters and receivers operating at different data rates.

It is a further object of the invention to provide an operational mode wherein one or more peripheral devices may be continuously read into selected memory areas with the data exchange selectively inhibited independent of the arithmetic processor.

An additional feature of this invention is an improved internal address generator employing a minimal number of hardware components.

Other and further objects, features and advantages of the invention will become apparent as the description proceeds.

Briefly, in accordance with a preferred form of the present invention, there is provided a data processing system comprising a memory subsystem, a general purpose arithmetic subsystem and an input-output master control which establishes communication paths with a plurality of channel control units. A plurality of peripheral devices comprising data receivers and data transmitters are selectively connected to respective ones of the channel control units. Both the general purpose arithmetic subsystem and the peripheral units via the input-output master control share the common memory subsystem, the peripheral units, however, having priority over the arithmetic subsystem as regards use of the memory subsystem. Moreover, those peripheral units having the highest data rates have priority access to the memory.

An input-output operation is initially started by an input-output command which designates the channel control, the particular peripheral unit connected thereto, whether the data exchange is to be an input or output operation, and the data exchange mode. A significant advantage of the present invention is the provision of a mode termed the cyclic mode in which the data exchange is continued in a completely autonomous manner with no further use of the arithmetic subsystem for processing data into and out of the system.

Another feature of the invention is the provision of a unique group of cells for each of the channel control units. These cells constitute an indirect address memory and specify the start, end and current address of a memory buffer area. This permits a substantial simplification in the internal address structure since each channel may be used to generate a binary code unique to the channel and constituting a portion of the internally generated address.

A more thorough understanding of the invention may be obtained by a study of the following detailed description taken in connection with the accompanying drawings in which:

FIG. 1 is a simplified block diagram illustrating the over-all system organization of the computer;

FIGS. 2A and 2B are a detailed block diagram of the computer system;

FIG. 3 is a schematic illustration of the gate circuitry interconnecting the memory buffer register and the I/O buffer register;

FIG. 4 is a partially block, partially schematic illustration of the sequence counter and control of the I/O master control;

FIG. 5 is a schematic illustration of the channel priority access control;

FIGS. 6A–6G are flow charts illustrating and defining the apparatus and structure of the I/O master control;

FIG. 7 illustrates schematically the internal address generator;

FIG. 9 is a detailed block diagram of the input-output register;

FIG. 10 illustrates schematically the channel buffer registers, the I/O master control buffer register, and interconnecting gate circuitry;

FIG. 11 is a block diagram of the disconnect and stop circuitry of each channel control unit.

GENERAL DESCRIPTION OF COMPUTER

Figure 8:
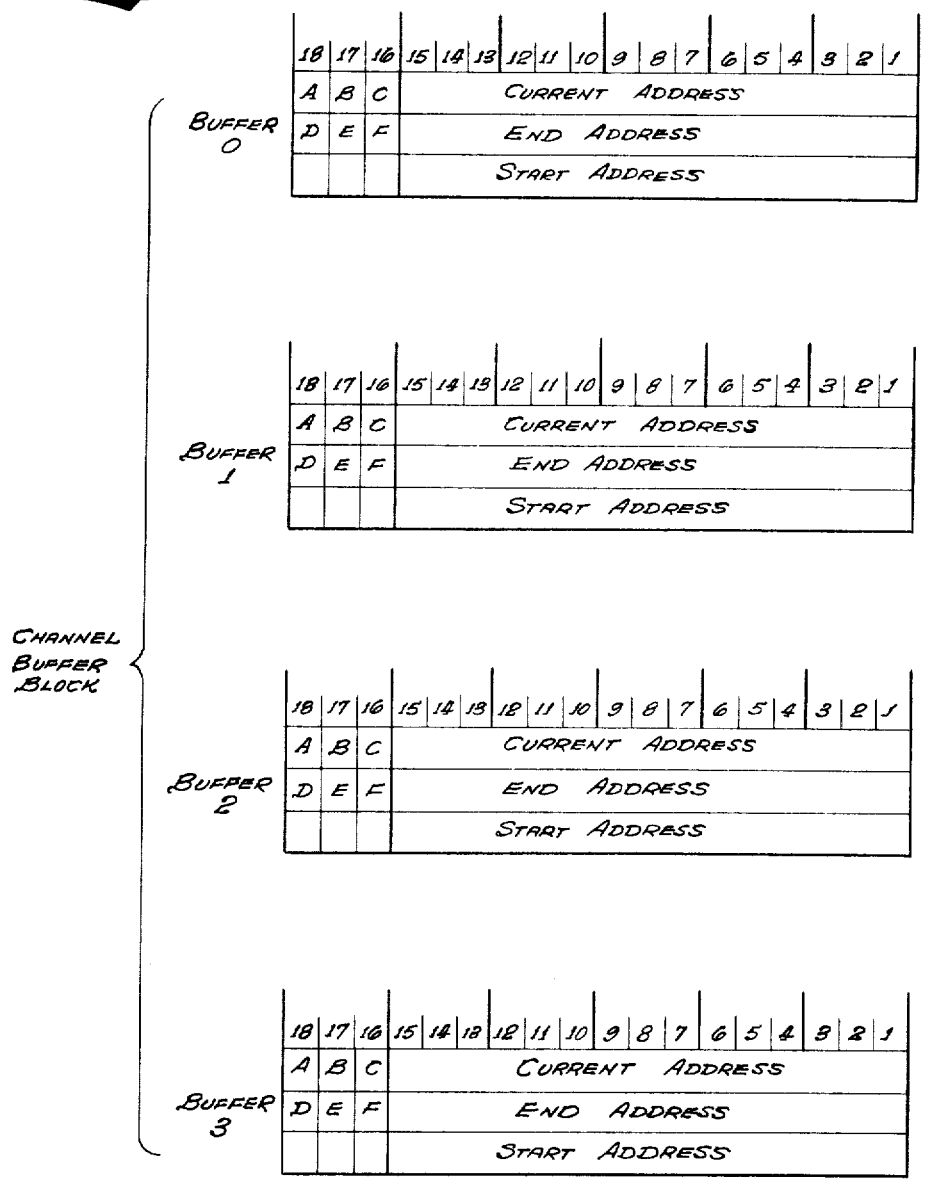
FIG. 8 illustrates a channel buffer block comprising four sets of three memory cells each.

Referring now to FIG. 1, the basic system organization of the computer is illustrated. The system comprises three major components: the memory subsystem 10, the general purpose arithmetic subsystem 11 and the input-output master control 12. The input-output control operates autonomously after being initiated by an I/O command from the arithmetic system 11 via I/O set-up line 13. Both the general purpose arithmetic subsystem 11 and the input-output control 12 share the common memory 10. Their use of the memory is time shared, the arithmetic subsystem being interrupted upon application of a signal from the I/O master control via interrupt control line 14 when the I/O master control requires the memory. Accordingly, the input-output control has priority over the arithmetic subsystem as regards use of the memory subsystem 10.

The input-output master control establishes communication paths with a plurality of channel control units 15. In the computer described herein, eight such channels are designated as channel "0" through channel "7." As will be apparent from the following description, the specific number of channels is determined by the user and the length of the command word used. A plurality of peripheral devices comprising receivers and data transmitters are connected in turn to each of the channel control units. In the specific machine described, sixteen such devices may be connected to a particular channel although again the specific number more or less may be employed according to the user and the command word length. By way of specific example, data source devices include electric typewriters, punched paper tape readers, punched card readers and magnetic tape units. Examples of data receiving devices are electric typewriters, high speed printers, alpha numerical displays, paper tape readers, and magnetic tape units.

The control console 17 is connected directly to the arithmetic subsystem 11 and permits direct communication between the operator and machine, bypassing the input-output master control 12.

*Brief description of computer operation*

*Initiation of command.*—In brief, the overall operation of the computer is as follows: Input-output and arithmetic commands are read by the general purpose arithmetic subsystem 11 from the memory 10. These commands are distinguished one from the other and the arithmetic commands utilized within the arithmetic subsystem. Upon receipt of an input-output command, the command is distinguished by the arithmetic subsystem which then attempts to transfer the command word to the input-output subsystem 12 via the I/O set up line 13. After acceptance of the command word by the input-output master control 12, the arithmetic subsystem 11 is free to continue its program while the input-output system controls the execution of the command.

As described above, the input-output portion has priority over the arithmetic portion of the computer regarding the use of the memory 10. For effecting this operation, the input-output master control 12 generates interrupt signals over the interrupt line 14 for the arithmetic subsystem during various phases of the input-output operation which require the memory 10. For example, if a single access memory is utilized, the arithmetic subsystem will be interrupted whenever data is being read from or into memory from the input-output master control.

*Selection of channel and peripheral device.*—The command word registered in the input-output master control 12 designates one of the eight input-output channels, one of sixteen peripheral devices connected to that channel, and the mode by which the data will be handled. The input-output master control, utilizing this information, makes a path available between the peripheral device and the input-output master control or, if a connection to an external device has already been made, the command may serve to break the connection. After a connection is made to a particular channel control unit, the channel itself retains this connection and controls the exchange of data between the selected peripheral device and the input-output master control according to the operating mode. The channel disconnects the external device either automatically on completion of data transfer through a termination signal generated by the external device or through a DISCONNECT command received from the arithmetic subsystem.

*Data exchange; address generator.*—For all commands except the control mode, described hereinafter, a data word or words are to be exchanged between the peripheral device and the memory. The memory address where a data word is to be stored or to be read from is obtained by the input-output master control 12 from the memory 10. These memory addresses are stored at memory locations unique to each channel. When a single word is to be transferred, the address where the word is to be stored or read from is generated by the input master control. When blocks of data words are to be exchanged, the memory address for a given channel must necessarily be changed so that each data word is stored in a discrete memory location. Therefore, the input-output master control 12 includes address modification structure for changing the memory address for each data word.

Another operation performed by the input-output master control 12 in combination with a channel control unit 15 is to allow each peripheral device to operate at its own time rate, i.e. permit the peripheral device to operate asynchronously from the computer which operates synchronously from an internal clock.

DETAILED DESCRIPTION OF THE INVENTION

A more thorough understanding of the invention may be derived from FIGS. 2A and 2B wherein is shown a substantially detailed block diagram of the invention. In this diagram, double lead lines designate multiple busses for transmitting command and data words. Generally, such a bus comprises one lead for each bit of a data word and an additional parity bit. In the specific embodiment described, the data word comprises eighteen bits. The single lead lines represent one or more control lines. The number of these lines will vary according to the different numbers of controls required between various portions of the computer.

*Memory subsystem*

The memory subsystem 10 may comprise a high speed magnetic core memory unit 25. A representative memory has the capacity of 32,768 eighteen bit words. The memory location is specified by the memory address bus 26 and read and write operations are respectively controlled by the read control line 27 and the write control line 28. When a read pulse is applied to the memory unit 25, the contents of the memory location specified by the memory address bus 26 are extracted from memory and transferred via the memory read bus 29. Conversely, when a pulse is applied on write control line 28, the data on memory write bus 34 is transferred into the memory location specified by the memory address bus 26. Section 12 of the Computer Handbook edited by H. D. Huskey and G. A. Korn published by the McGraw-Hill Book Company in 1962 may be consulted for a more detailed description of magnetic core memory devices.

*General purpose arithmetic subsystem*

A command word applied to the memory read bus 29 is transferred from the memory unit 25 to the memory buffer register 30 and the command register 31 of the arithmetic subsystem 11. After the command word is read out of the memory into the command register 31, it is sensed by decoder 32 as to the specific type of command. If the command is an input-output command, an appropriate output signal is supplied to the arithmetic subsystem controller 33.

Controller 33 attempts to transfer the input-output command word to the input-output master control 12 by signalling the sequence counter and control 40 of the I/O master control via I/O set-up line 13. The input-output subsystem accepts commands only for those channels which are not already busy with the exception of a DISCONNECT input-output command which sets a channel to the "not busy" state. If a channel is busy, any other command is retained in the arithmetic subsystem until accepted by the I/O master control 12. After acceptance of the command by the input-output master control 12, the controller 33 of the arithmetic subsystem resets the memory buffer register 30 and command register 31 so that the arithmetic subsystem is free to continue its program while the input-output subsystem controls the execution of the input-output command.

*Input-output master control*

*I/O buffer register.*—When the input-output master control accepts a command, the input-output command is transferred from the memory buffer register 30 of the arithmetic subsystem into the I/O master control buffer register 41 via command bus 42. As shown in FIG. 3, both the memory buffer register 30 and I/O master control buffer register 41 may comprise eighteen bit storage registers. A suitable gating network is associated with each stage of the I/O buffer register, a portion being shown in FIG. 3. Each lead of the command bus is connected to an input of a respective AND gate exemplified by AND gates 43, 44 interconnecting the "one" and "eighteen" bit stages, respectively of the registers. The other input of each of these AND gates is driven by the output of amplifier 45. The input of this amplifier is connected to AND gate 46 whose inputs are respectively connected to the computer clock 47 and the I/O master control sequence counter and control 40. The coincidence of a clock pulse and a signal from sequencer 40 enables AND gate 46 to energize AND gates 43, 44 (and others not shown). The information in each stage of the memory buffer register 30 is consequently sent through AND gates 43, 44 and others into the respective stages of the I/O buffer register 41. Similar gating arrangements are used in conjunction with each of the registers in the I/O master control and the individual channel control units described below.

*Input-output command format.*—The format of the input-output command is also illustrated in FIG. 3. C (bits eighteen, seventeen, sixteen, fifteen and fourteen) designate the command as an input-output command. This portion only is read by the decoder 32 of the arithmetic subsystem. Bit fourteen designates whether the command is an input or an output command. EXM (bits thirteen and twelve) specifies one of four channel operating modes, described in detail hereinafter. EXN (bits eleven, ten and nine) specifies a particular one of the eight channels. EXC (bits eight, seven, six and five) contain control information for the external device, e.g. a command to a magnetic tape unit to rewind its tape. EXA (bits four, three, two and one) specifies one of the sixteen peripheral units of the channel defined by EXN.

*I/O sequence counter and control.*—The sequence counter and control 40 is illustrated in detail in FIG. 4. As shown therein, an encoder unit 50 having sixteen distinct input terminals numbered "0" through "15" is connected to a four stage flip-flop counter 51 by eight connecting leads 52. Counter 51 is connected by eight output leads 53 to a decoder unit 54 having sixteen distinct output terminals. Encoder 50 converts the sixteen-line input to a binary encoded eight-line readout and decoder 54 reconverts the eight-line output of counter 51 to a sixteen-line output.

The particular count between zero and fifteen registered by counter 51 is determined by a gating network connecting the output of decoder 54 and the input of encoder 50, this network being exemplified by the four AND gates 55, 56, 57 and 58. Particular operations are performed at predetermined counts registered in the counter 51, as described hereinafter. The counter automatically advances in a predetermined sequential order determined by the input signal to the gating network. For example, AND gate 56 determines the transfer of the I/O command word from the memory buffer register in the following manner: The counter 51 is initially in a reset state with all flip-flops registering zero and the zero output terminal of the decoder energized. Upon coincidence of a clock pulse from the computer, clock 47 and an output from the arithmetic subsystem controller 33, AND gate 56 is energized whereupon a pulse is supplied the "14" input terminal of encoder 50. Flip-flop stages of counter 51 are then triggered to assume the binary equivalent of the number fourteen. As a result, an output signal appears on the "14" output lead of decoder 54. This signal activates the I/O master control buffer register 41 so that it duplicates the contents of the memory buffer register 30 as described hereinabove. The functions of the other AND gates 55, 57 and 58 are described below.

*Flow diagram of I/O command*

The operation of the I/O master control sequence counter and control 40 may be further illustrated by reference to the flow diagrams of FIGS. 6A and 6B. In this type of diagram, a rectangle represents a processing function performed at the designated sequence count, a diamond represents a decision performed by circuitry within the I/O master control and a circle represents a signal supplied for performing additional processing functions. As shown, when the sequence counter and control 40 is in a reset state (count 00) it is available for access from either the arithmetic subsystem 11 or a channel control unit 15 previously connected to the I/O master control. As described above, a signal from the arithmetic subsystem signifies an I/O command which causes the counter 51 of the control 40 to proceed to a count of fourteen (14). As described in detail below, a signal from a channel control unit 15 signifies either that a data exchange is required whereupon the counter 51 advances to a one (01) count or it signifies that channel flags are required whereupon the counter 51 advances to a three (03) count.

FIG. 6B is a flow diagram illustrating the complete I/O command function. At the sequence count of fourteen, the I/O buffer register 41 is loaded with the command data word temporarily stored in the memory buffer register 30 of the arithmetric subsystem. A decision is then made as to whether the command in the I/O buffer register is a disconnect command. If it is (YES), the sequencer control 40 disconnects the channel designated by the command word and the sequence counter and control are reset to their zero states. If it is not a disconnect command (NOT), a further decision is performed as to whether the designated channel is already busy. If it is not, the sequence counter advances to a count of 15 and sets up to channel in the manner described hereinabove. The sequence counter is then reset. If the channel is already busy, a still further decision is made for determining whether the channel requires a data exchange or flags, the sequence count being set to a one count for the former and a three count for the latter. The former function is described in detail below. The latter function is described and claimed in the copending application of Walter Klein entitled "Data Processing System Having Programmable, Multiple Buffers and Signalling and Data Selection Capabilities," filed concurrenty herewith, Serial No. 286,647.

*Channel selection and transfer of commond word to selected channel.*—A decoder 59 is connected to the "eleven," "ten," and "nine" bit stage of the I/O buffer register 41 and supplies a signal at one of its eight outputs 60 for connecting the selected channel to the I/O master control. By way of example, if channel No. "7" is designated by the EXN portion of the stored I/O command word, a signal is placed upon signal lead 61 connected to three buffer registers within the channel control unit 15 of channel "7."

*Channel control unit*

*Channel buffer register, channel input-output register and channel mode register.*—Each channel control unit includes an eighteen bit channel buffer register 62, a one bit input/output register 63 and a two bit mode register 64. The signal on lead 61 actuates gates associated with the channel buffer register 62, the input/output register 63 and the mode register 64 whereupon the entire contents of the I/O buffer register are duplicated in the channel buffer register 62, the "fourteen" bit is duplicated in the input/output register 63 and EXM is duplicated in the mode register 64.

*Connection between channel control unit and peripheral device.*—Each channel control unit includes a channel sequencer control 65 which both transmits and receives control signals from the peripheral unit 16 via respective control lines 66, 67. The action of the channel sequencer and control is initiated by the I/O master control sequencer counter and control via control line 68. When the channel register 62, 63 and 64 have been filled from the I/O buffer register 41, all of the peripheral units 16 of the selected channel are activated. Each of these peripheral units are connected to the channel buffer register 62 by an output bus 69 and an input bus 70. When the peripheral units are activated, they are each connected to the channel buffer register 62 via the output lead 69. Each of these units includes an individual decoder adapted for sensing the peripheral equipment address portion (EXA) of the I/O command word stored in the channel buffer register. One and only one of the decoders will perform and this peripheral unit connects to the output bus 69, the input bus 70 and the set of control lines.

Channel priority access control

One or all of the eight channels may be connected to the I/O master control in the manner described hereinabove. All channel control units may simultaneously and independently exchange data with one peripheral unit each, since each channel unit contains one channel buffer register 60. Only one channel unit at a time, however, may exchange data with the I/O master control unit. The flow of data between the memory subsystem 10 and the individual channel buffer register via the input-output master control is regulated by the channel priority access control 75. As shown in FIG. 2B, the unit includes a separate input 76 for each of the eight channels and an output 77 indicating the selected channel, this output being connected to the sequence counter and control 40 and internal address generator 78 of the I/O master control 12.

A preferred embodiment of the channel priority access control assigns a predetermined priority access to each channel, e.g. channel No. "0" has the lowest priority; channel No. "1" the next higher priority and so on. This arrangement guarantees that in case of simultaneous requests for more than one channel, the channel with the highest priority is served first. This time sharing makes it possible to maintain independent data flow paths simultaneously between a number of memory storage storage areas and various external peripheral devices operating at different data rates. The peripheral devices are connected to their channels such that for any given data exchange conditions, the device rates correspond to the channel priorities. Thus, the slowest peripheral units are connected to the lowest priority channel; correspondingly, the highest-speed peripheral units are connected to the highest priority channel.

A detailed schematic of the channel priority access control is illustrated in FIG. 5. The highest priority channel No. "7," connected to input line 76a is connected to a channel priority register 80 via AND gate 81. Another input of AND gate 81 is connected to the computer clock 47. Channel priority register 80 is an eight stage register having three output leads 78a, 78b and 78c designating in binary code the activated stage of the register 80. As described hereinafter, these leads form a portion of the internal address generator. Other portions of the complete system require a discrete signal representing the connected channel. This function is provided by the priority register decoder 84 which decodes the binary coded signal on leads 78a, 78b and 78c and activates a particular one of its output leads 85 corresponding to the number of the interconnected channel.

The next highest priority channel (channel No. "6" connected to input line 76b) is connected to the channel priority register 80 via an AND gate 82 having additional inputs coupled to the clock 47 and to the preceding input 76a via an inverter 86. In similar manner, the succeeding input channel (channel No. "5" connected to input line 76c) is coupled to the channel priority register 80 via AND gate 83 having other inputs coupled to the clock and to the preceding inputs 76a and 76b via inverters 86, 87.

In operation, if there is a signal on lead 76a upon occurrence of a clock pulse, priority register 80 registers "seven" in binary code. No other stage may be set ON since the signal on lead 76a, after inversion by inverter 86, blocks closing of each of the succeeding AND gates. Similarly, if there is no signal on lead 76a upon receipt of a clock pulse, but there is one on line 76b, register 80 will register "six" in binary code. No succeeding stages will be set on since the signal on lead 76b blocks energization of AND gate 83 and each of the succeeding AND gates (not shown) In like manner, any higher priority channel will block those below it by identical logic gating elements (not shown).

Internal address generator

The channel sequencer control 65 of each channel signals the channel priority access control 75 when it is ready for a data exchange with the memory subsystem 10. As described above, the priority access control determines which channel is connected to the memory when there are simultaneous requests from more than one channel. After a particular channel is connected to the I/O master control 12, the internal address generator 78 generates the memory address unique to that channel over the address bus 90.

A detailed schematic of the internal address generator is illustrated in FIG. 7. As shown, the address bus 90 comprises fifteen leads of which the No. "8'" through "15" leads are grounded (binary zeros). Leads No. "1" and No. "2" are derived from the sequence counter and control and designate whether the address sought is the current, start or end address. These different addresses are described in detail below. Leads Nos. "3" and "4" are connected via an eight way switch 100 to the address section register 101 of the particular channel connected by the priority access control 75. This structure is also described in detail below, it sufficing to state at this point that these leads designate in binary code one of four buffer areas in the magnetic core memory unit 25. Leads Nos. "5," "6" and "7" comprise leads 78a, 78b and 78c at the output of the channel priority register 80 (FIG. 5). As described above, these leads designate in binary code the channel connected by the priority gating network of the channel priority access control 75.

Accordingly, the internal address generator automatically generates with a minimum number of hardware components an address unique for each of the eight channels. This address is connected to the magnetic core memory unit 25 via the address bus 90 and the memory address switch 102, the latter switch being controlled by the sequence counter and control 40 via control line 105 to selectively connect either the internal address generator 78 or the I/O address register 110 to the memory address bus 26. The specific portion of the memory designated by the internally generated address may be transferred into the I/O master control buffer register 41 or the address register 110 upon application of a pulse on read control line 27. As described above, the computer uses an indirect address system wherein the address information so derived designates still another address of the magnetic core memory unit 25 at which data is to be transferred into or out of by the peripheral unit connected to the channel selected by the priority access control 75. The manner in which this address information is used and modified by the I/O master control unit 12 is described in the following section.

ADDRESS MODIFICATION STRUCTURE

Overall description

Each channel is associated with at least one set of three memory cells, each cell having a storage capacity of 18 binary bits in the specific example described herein. These cells provide an indirect address of the memory subsystem since each cell provides addresses where data words are to be stored into or read out of. A novel feature of the invention of Walter Klein, one of the inventors hereof, and claimed in the co-pending application entitled "Data Processing System Having Programmable, Multiple Buffers and Signalling and Data Selection Capabilities" filed concurrently herewith, Serial No. 286,647 is that of providing a plurality of buffer sets for each channel. Four such buffer sets are shown in FIG. 8 and together comprise a channel buffer block. Each set of three cells controls a buffer area located anywhere in the magnetic core memory unit 25 and of any length permitted by the storage capacity of the memory.

In each buffer set, the current address and bits A, B and C are stored in one cell, the end address and bits D, E and F are stored in another cell and the start address is stored in the remaining third cell.

The binary value of the B bit is used for indicating the capacity of a buffer storage area. The value of B is set to "0" when the buffer has a capacity of a single word; the binary value of B is set to "one" when the buffer has a capacity for more than one word.

The binary values of the A, C, D, E and F bits indicate certain predetermined system functions and information supplying external signals as described below.

In brief, the operation of the address modification portion of the I/O master control is as follows: The current address is read from the magnetic core memory unit 25 into the I/O master control buffer register 41. This address is then transferred into the address register 110 of the I/O master control and directed to the memory address bus 26 via memory address switch 102. For input data exchanges, the data stored in the channel buffer 62 of the selected channel is read into the buffer register 41 of the I/O master control and subsequently transferred into the buffer of the memory subsystem 10 determined by the current address stored in the address register 110. For output data exchanges, the data is read from the buffer of the memory subsystem 10 as determined by the address stored in the address register 110 into the buffer register 41. Subsequently, this data is transferred into the channel buffer register of the selected channel. All of these operations are under the control of the sequence counter and control 40 of the I/O master control as described hereinafter.

For buffer areas of the magnetic core memory unit 25 having capacities greater than one word ($B=1$), the current address must be modified for each data word exchanged. This operation is performed by reading the current address into the I/O master control, incrementing it by one, and comparing the resulting address with the end address. If the two addresses are equal, the C bit is set to one. When used the next time, the C bit then restores the current address to the start address rather than incrementing it. At the same time, C is then set to zero. The incremented current address or the restored start address is the effective memory address.

Flow chart description of address modification

The address modification structure and procedures briefly described hereinabove are described in more detail by reference to the flow charts of FIGS. 6C through 6H.

*$B=0$.*—Referring now to FIG. 6C, the sequence counter and control 40 is initially in a reset state (Count 00) at which count a data request is received from the channel priority access control 75. At such time, the sequence counter advances to a count of one (01) and initiates gates connected to the I/O master control buffer register 41 for transferring thereto the current address from the magnetic core memory unit 25. As described hereinabove, this current address is selected from the cell unique to the channel requesting a data exchange. By way of further explanation, the detailed illustration of sequence counter and control 40 of FIG. 4 illustrates this particular operation. As shown, AND gate 55 is actuated when counter 51 is in the 00 state upon coincidence of a clock pulse and an output signal from the channel priority access control 75. The output of this AND gate is connected to the No. "1" input of encoder 50 which causes counter 51 to advance to the 01 count and provide a signal on the No. "1" output of decoder 54 directing that the current address be read.

Referring again to FIG. 6C, the sequence counter advances to 03 at which count the control 40 causes the end address to be read into the I/O master control address register 110. As shown in FIG. 5, the current, start and end addresses are modified simply by changing the binary values of the "1" and "2" bits of the internally generated address. The sequence counter then advances to the 04 count and the end address is rewritten into the magnetic control memory unit 25 from the address register 110 in order to preserve this address for subsequent data exchanges. Signal flags may also be produced at this step in the manner described below. The counter then advances to the 06 count at which count the current address is both rewritten into the memory core from the buffer register 41 and transferred into the address register 110. A decision is then performed by the sequence control counter and control 40 depending upon whether or not the original I/O command word specified an input or output data exchange and whether or not the value of the A bit is zero or one. If the input-output register 68 of the select channel specifies an input operation, and $A=0$, the sequence counter is advanced to the 09 count. If an output operation is specified, and $A=0$, the sequence counter advances to a count of eleven (11). If the value of $A=1$, the sequence counter is reset to zero.

*Data exchanges; input.*—The steps constituting actual data exchange are illustrated in flow diagrams of FIGS. 6F and 6G for input and output data exchanges respectively. As shown in FIG. 6F, the sequence counter 40 at the count of nine (09) performs the dual functions of preparing the magnetic core memory unit 25 by vacating the memory cell designated by the current address (this address being stored in the address register 110 and operatively connected to the memory address switch 102). At count 09, the data stored in the selected channel buffer register 62 is also transferred into the I/O master control buffer register 41. Subsequently, at the count of ten (10), the channel data now stored in the buffer register is written in the designated buffer area of the magnetic core memory unit 25 via the memory write switch 112 and memory write bus 34. The sequence counter then resets to the zero (00) state at which time all of the registers in the I/O master control are reset to zero.

*Data exchanges; output.*—Referring now to FIG. 6G, the sequence counter 40 at the count of eleven (11) causes the data stored at the memory location located by the address generator (now temporarily stored in the I/O address register 110) to be read from the memory into the I/O buffer register 41. At the following sequence count of twelve (12), the data is both rewritten back into the memory and duplicated in the channel buffer register 62 of the selected channel. The channel sequencer control 65 then transfers this data into the selected peripheral unit. After sequence count twelve, the sequence counter resets to the zero (00) state.

*Counter and control circuitry for performing data exchanges.*—Circuitry for performing the data transfers illustrated in FIGS. 6F and 6G is shown in FIG. 4. AND gates 57 and 58 are both responsive to a sequence count of six (06) and to a zero A bit. An input/output register 120 within the I/O master control 12 has one output designating an input data exchange to AND gate 58 and another output designating an output data exchange to AND gate 57, the outputs of these AND gates being respectively connected to the No. "9" and No. "11" inputs of encoder 50 whereby the counter 51 is advanced to the nine count upon coincidence of an input signal and clock pulse and to an eleven count upon coincidence of an output signal and clock pulse.

*Input-output register.*—Detailed structure illustrating the input-output register 120 is illustrated in FIG. 9. A 2 x 8 selector switch 125 has a plurality of doublet inputs connected to each input/output register 68 of the respective channels and eight inputs connected to the priority register decoder 84 described hereinabove. Thus, the input or output signal specified at the output of switch 125 corresponds to the state of the input/output register designated by the priority control 75.

The circuitry for transfer of data between the channel buffer register and the I/O master control buffer register is illustrated in detail in FIG. 10 wherein are shown the eighteen bit buffer registers 62 of channels Nos. "0" and "7" and an eighteen bit I/O master control register 41 connected thereto by an AND-OR gate arrangement. Thus, the one stage of the channel No. "0" buffer register is connected to the one stage of the master control buffer via AND gate 130 and an OR gate 131. Similarly, the one stage of the channel No. "7" buffer register is connected to the input of the one stage of the buffer register 41 via AND gate 132 and OR gate 131. AND gates 133 and 134 and OR gate 135 similarly interconnect the eighteen stage of the channel buffer register to the input of the eighteen stage of buffer register 41. Similar AND-OR gates (not shown) interconnect the other stages.

AND gates 132 and 134 associated with the channel No. "7" buffer register are driven by amplifier 140 connected to the output of AND gate 141, the latter AND gate being actuated by the coincidence of a clock pulse, a signal from the sequence counter and control 40 and the selection of channel No. "7" by the priority register decoder 84. Accordinglly, upon the coincidence of these three signals, the AND gates 132 and 134 are actuated and the data stored in the channel No. "7" buffer register is duplicated in the master control buffer register 41. In like manner, AND gate 130 133 associated with the channel No. "0" buffer register are driven by amplifier 142 and AND gate 143, which gate in turn is responsive to the simultaneous occurrence of a clock pulse, a signal from the sequence counter and control 40 and the selection of channel No. "0" by the priority access control 75 as designated at the output of the priority register decoder 84.

*B flag=1; C flag initially zero.*—FIG. 6D comprises a flow chart illustrating the address modification when the current address is initially different than the end address. As shown, the initial operation at a sequence count of one is identical to that when the B flag is zero i.e., the current address is read from the memory into the I/O buffer register. At this time, the I/O master control senses that the B flag equals one. The end address is then read into the I/O address register 110 from the memory and in addition the value stored in the buffer register 41 is incremented or increased by a binary adder 150 (FIG. 2A) which performs a simple binary addition on the address stored in the buffer register 41. The next operation is performed at the sequence count four (04) when the end address is re-written into the memory from the I/O master control address register 110 and simultaneously compared with the current address stored in the buffer register 41 by the comparator 151. The next operation is performed at the sequence count of six (06) when the C flag is set to one if the end address equals the current address. The modified current address is then written into the memory from the I/O buffer register 41 and the value of the I/O buffer register transferred to the I/O address register 110. If the end address does not equal the current address, the incremented current address with the C flag equal to zero is written into the memory from the I/O buffer register 41 and also transferred to the I/O address register 110. Following the sequence count of six, the data transfer occurs as detailed in FIGS. 6F and 6G if the A bit is zero as described above wherein the address temporarily stored in the address register 110 specifies the memory core in which data is to be read into or from. If the A bit equals 1, the sequence counter and control 40 is immediately reset to its zero state as described hereinabove.

*B flag=1; C flag=1.*—This operation is illustrated in FIG. 6E. When the C flag is initially equal to one, the information is available at the sequence count one that the current address is equal to the end address. Accordingly, the start address is read into the I/O buffer register 41 at the sequence count three (03). At the sequence count of four (04), the start address is re-written into the memory from the I/O address register 110 and the C flag bit set to zero in the address register 110. At the sequence count six (06), the address in the address register 110 is written into the memory as the current address with the B flag equal one and the C flag equal to zero. This current address is also retained in the address register 110 and serves as data address for the selected channel in the manner described hereinabove.

COMPLETION OF INPUT-OUTPUT FUNCTION

Operational modes

As described hereinabove, the original data command word read from the program stored in the memory subsystem 10 included EXN comprising bits 13 and 12 which specify one of four channel operating modes, namely the control mode, the single word mode, the single block mode and the cyclic block modes. Whichever mode is specified by the command word determines the manner in which the input-output operation is terminated.

*Channel disconnect and stop sequencer and control.*—Each channel control unit 15 includes a disconnect and stop sequencer and control 160 as shown in FIG. 11 responsive to mode decoder 161, the I/O sequence counter and control 40, start and stop control lines 162, 163 and terminate line 164 connected to the peripheral units 16. The disconnect and stop sequencer and control 160 provides a pair of output lines 165 and 166 over which signals are supplied to the remainder of the channel control elements including the registers and into the peripheral units for terminating or suspending the input-output operation. The function of the disconnect and stop sequencer and control 160 will be described in relation to the four operating modes in the following paragraphs.

*Control mode.*—The control mode is designated by a command word having binary zeros for the thirteen and twelve bits. The values of these bits are sensed by the mode decoder connected to the channel mode register 64. After receipt of the data command by the designated peripheral device, a disconnect and stop signal is supplied line 165 of the disconnect and stop sequencer and control 160 which disconnects the peripheral device and returns the channel to the "not busy" state. Thus, no memory cell is affected by a control mode command. Such commands include, for example, a rewind tape command for a peripheral magnetic tape unit and a DISCONNECT command which is accepted by a busy channel for disconnecting the peripheral device.

*Single word mode.*—This mode is designated by bits thirteen and twelve of the command word having the binary values zero and one respectively. After a single word is transferred between the selected peripheral device and any one memory cell as defined by the address modification structure, the disconnect and stop sequencer and control 160 supplies an output over its output leads 165 to reset the channel control unit to the "not busy" state and disconnects the peripheral unit.

*Single block mode.*—This mode, designated by one and zero values respectively for bits thirteen and twelve, results in an output on line 165 of the disconnect control 160 after a block of words has been transferred between selected peripheral unit and a block of memory cells as specified by the address modification structure.

*Cyclic block modes.*—A significant feature of the present invention is the provision of a cyclic block mode of operation designated by bits thirteen and twelve each having a binary one value. In this mode, blocks of words are continuously transferred between the selected peripheral unit and a block of sequential memory cells as defined by the corresponding address modification structure. At the end of a block, the start conditions are restored and the transfer continues until DISCONNECT command is received from the memory subsystem 10 via the arithmetic subsystem 11. Thus, so long as the mode decoder 161 senses a cyclic mode condition, a signal is not applied to the disconnect and stop line 165 unless and until a disconnect COMMAND is received.

In the cyclic mode only, a channel accepts start and stop pulses over the respective lines 162 and 163. These signals may be generated by SIGNAL commands described hereinafter or by other channels. On application of a stop signal, a stop signal is supplied at the output of line 166 to the channel which prevents the exchange of data but permits the peripheral unit to remain connected to the channel. A stop signal may be applied at any time. However, the channel will only stop after having reached the end of a buffer memory section.

In effect, the cyclic mode enables a channel and peripheral unit to remain connected and available for data transfer without requiring that a command be programmed in the memory subsystem and read by the arithmetic subsystem. The latter type operation not only requires the time of the arithmetic subsystem but also introduces a delay in handling data from a high speed data input source, e.g. a high speed analog to digital converter which is continuously generating input data asynchronously with respect to the computer. Certain of this data would be lost if a separate command were required to reconnect the peripheral unit for each data exchange.

Figure 12:
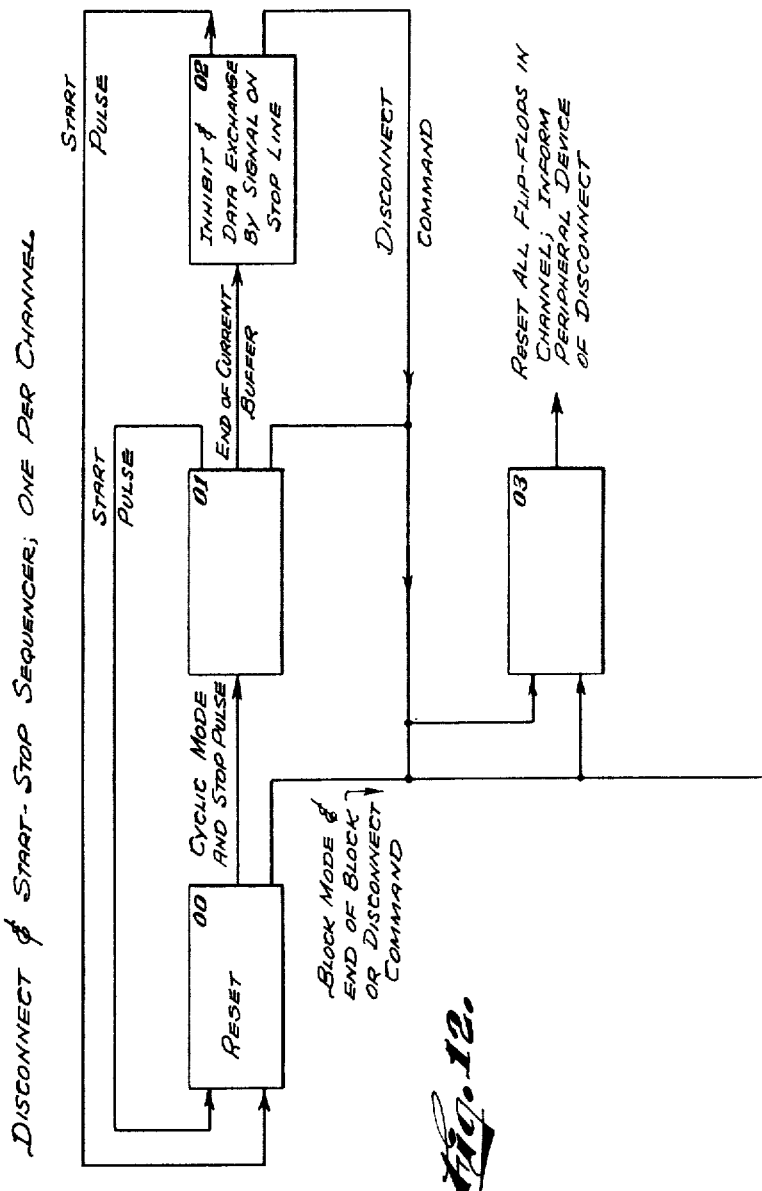
FIG. 12 is a flow chart illustration of the disconnect and stop channel sequencer and control.

*Flow chart illustration of disconnect and start-stop sequence.*—Referring now to FIG. 12, a flow chart of the disconnect and stop sequencer 160 is illustrated. As shown, the sequencer has four mutually exclusive stable conditions (00, 01, 02 and 03) determined by the input signals applied thereto. Following the reset state (00), the sequencer advances to the 01 state in cyclic mode upon application of a stop pulse on line 163 or to the 03 state in block mode upon reaching the end of the channel buffer block (FIG. 8) or upon receipt of a DISCONNECT command.

Following state 01, the sequencer automatically advances to state 02 at the end of the current buffer, that is the particular buffer memory being used when the stop pulse was received. In the 02 state, the channel control unit inhibits the exchange of data by supplying a signal on stop line 166. As shown, a start pulse on line 162 applied when the sequencer is in either of the 01 or 02 states causes it to be reset to the 00 state. Likewise, a DISCONNECT COMMAND advances the sequencer to the 03 state wherein all channel flip-flops are reset and the peripheral device is informed so that it disconnects itself from the channel control unit. Also, in the block mode, the sequencer automatically advances to the 03 state at the end of the designated block.

Although an exemplary embodiment has been disclosed and discussed, it will be understood that other applications of the invention are possible and that the embodiment disclosed may be subjected to various changes, modifications and substitutions without necessarily departing from the spirit of the invention.

We claim:
1. A data processing system comprising
   a plurality of peripheral data transmitting and receiving devices,
   a plurality of channel control units each having respective ones of said peripheral devices coupled thereto,
   a memory subsystem having a unique cell reserved for each of said channel control units, said cell containing the indirect address of a memory buffer area,
   a general purpose arithmetic subsystem for performing computation upon binary coded data and for receiving both arithmetic and input-output commands from said memory usbsystem,
   said arithmetic subsystem including means for distinguishing an input-output command and initiating a data exchange between a selected peripheral device and the memory buffer area associated with its channel control unit,
   means responsive to a predetermined command word for providing an operational mode providing a continuous data exchange between a selected peripheral device and memory buffer area independent of said arithmetic subsystem.

2. The data processing system defined in claim 1 comprising
   means for inhibiting data transfers between said peripheral devices and said memory subsystem during said operational mode, said means being independent of said arithmetic subsystem.

3. The data processing system defined in claim 1 comprising
   means for regulating the flow of data between said memory subsystem and said peripheral data transmitting and receiving devices so that the devices having the highest data rates are automatically afforded the highest priority use of said memory subsystem.

4. In a data processing system, the combination of:
   a plurality of peripheral data transmitting and receiving devices,
   a plurality of channel control units each having respective ones of said peripheral devices coupled thereto,
   a memory subsystem having a unique cell reserved for each of said channel control units, and
   means coupled between channel control units and said memory subsystem for providing an operational mode wherein one or more of said peripheral devices may continuously exchange data with a selected memory area.

5. In the data processing system defined in claim 4,
   means for generating a binary encoded code corresponding to each channel control unit for automatically generating the address of said reserved cell.

6. In the data processing system defined in claim 4,
   means for regulating the flow of data between said memory and said peripheral data transmitting and receiving devices so that the devices having the highest data rates are automatically afforded the highest priority use of said memory.

7. In the data processing system defined in claim 4,
   a general purpose arithmetic subsystem for performing computation upon binary coded data and for receiving both arithmetic and input-output commands from said memory,
      said arithmetic subsystem including means for distinguishing an input-output command and subsequently transferring said command to said means coupling said channel control units and said memory subsystem after which said arithmetic subsystem is free for performing arithmetic computations and receiving subsequent commands from said memory.

8. In the data processing system defined in claim 7, said input-output command designates the operating mode, the input-output channel, one of the peripheral devices of said channel, and control information for said peripheral device.

9. In the data processing system defined in claim 4, each of said channel control units comprising
    a channel buffer register for initially registering said input-output command and subsequently the data being transferred between said memory and the selected peripheral device,
    a register for registering whether the data is to be transferred in or out of said memory, and
a register for registering the particular channel operating mode.

10. In the data processing system defined in claim 4 a channel priority access control for regulating access of each of said channel control units to said memory subsystem comprising
    a channel priority register responsive to a plurality of inputs corresponding to each of said channels and adapted to register a count corresponding to the channel requesting access to said memory subsystem, and
    gating means connected between said channels and said register inputs so that an access request from a higher priority channel will block access requests from lower priority channels.

11. In a data processing system, the combination of:
peripheral data transmitting and receiving devices,
a channel control unit for selectively coupling said peripheral devices to a memory subsystem,
a memory subsystem having a group of cells reserved for said channel control unit specifying the start, end and current address of a memory buffer area,
means for selectively terminating the data exchange between said selected peripheral device and said memory subsystem by resetting said channel control unit and disconnecting said peripheral device when the end of said memory buffer area is utilized for a data exchange (when the current address equals the end address) or cyclicly continuing the data exchange by utilizing said start address as the current address for the data exchange immediately succeeding said end address.

12. In a data processing system, the combination of:
peripheral means for supplying data to the system and receiving data therefrom,
means for storing command and data words and having a group of cells specifying the start, end and current address of a memory buffer area,
means responsive to an input-output command for designating block and cyclic modes of data exchange,
means responsive to said data exchange modes for regulating the exchange of data between said peripheral means and said memory subsystem for selectively terminating the data exchange when the current address equals the end address (block mode) or cyclicly continuing the data exchange by utilizing the start address as the current address immediately succeeding said end address (cyclic mode).

13. In the data processing system defined in claim 12, arithmetic means for performing computation upon binary coded data and
means independent of said arithmetic means for inhibiting the data exchange during said cyclic mode of data exchange.

14. In a data processing system, the combination of:
a plurality of peripheral data transmitting and receiving devices,
a plurality of channel control units each having respective ones of said peripheral devices coupled thereto,
a memory subsystem having means for storing command and data words and having a unique group of cells reserved for each channel control unit specifying the start, end and current addresses of a memory buffer area,
each of said channel control units including a disconnect and start-stop sequencer responsive to data exchange modes designated by input-output commands, said sequencer having four states as follows: a first reset state, a second state determined by the coincidence of a block data exchange mode and the end of a memory buffer area (when the current address equals the end address) which causes the control channel to be reset and the peripheral device to be disconnected, a third state responsive to a cyclic data exchange mode and stop pulse which state is retained until reaching the end of the memory buffer area, and fourth state following said third state wherein the data exchange is inhibited between the peripheral device and the selected memory area,
    said sequencer being reset by a start pulse during a cyclic mode and at the end of the block mode when the entire channel control unit is reset.

15. In a data processing system, the combination of:
a plurality of input-output channels,
a memory subsystem having a group of cells reserved for each input-output channel and containing the start, end and current addresses of a memory buffer area;
an internal address generator for automatically generating the address of said reserved group of cells including
    address modification means for specifying the current, start or end address by respective binary signals on a pair of leads and
    means for supplying binary signals on a suitable number of leads for designating said input-output channels,
means including said leads connected to the memory address bus of said memory subsystem.

16. In the data processing system defined in claim 15 means for registering the current address read from the memory location designated by said internal address generator,
means for connecting said temporarily stored current address to the memory address bus of said memory subsystem, and
means for exchanging data between the selected input-output channel and the memory buffer area designated by said stored current address.

<center>No references cited.</center>

ROBERT C. BAILEY, *Primary Examiner.*

R. B. ZACHE, *Assistant Examiner.*